United States Patent [19]
Ohara et al.

[11] Patent Number: 6,161,786
[45] Date of Patent: Dec. 19, 2000

[54] SPINNING REEL FOR FISHING HAVING TRANSPARENT LINE ROLLER

[75] Inventors: Takeshige Ohara, Saitama; Kazuyuki Matsuda, Tokyo, both of Japan

[73] Assignee: Daiwa Seiko, Inc., Japan

[21] Appl. No.: 09/359,777

[22] Filed: Jul. 26, 1999

[30] Foreign Application Priority Data

Jul. 27, 1998  [JP]  Japan ................................... 10-210778
Jun. 18, 1999  [JP]  Japan ................................... 11-173042

[51] Int. Cl.$^7$ .................................................. A01K 89/01
[52] U.S. Cl. ........................................ 242/231; 242/157 R
[58] Field of Search .................................. 242/231, 232, 242/233, 230, 157 R

[56] References Cited

U.S. PATENT DOCUMENTS

| | | | |
|---|---|---|---|
| 3,670,984 | 6/1972 | Lemery ................................... | 242/231 |
| 3,787,229 | 1/1974 | Rudness ............................... | 242/157 R |
| 4,562,976 | 1/1986 | Ban ......................................... | 242/231 |
| 5,149,006 | 9/1992 | Hitomi ................................... | 242/231 |
| 5,261,627 | 11/1993 | Shinohara .............................. | 242/231 |
| 5,547,139 | 8/1996 | Kaneko ................................... | 242/231 |
| 5,560,561 | 10/1996 | Henriksson ............................. | 242/231 |
| 5,651,508 | 7/1997 | Tsutsumi ................................ | 242/231 |
| 5,686,331 | 11/1997 | Shinohara et al. ....................... | 242/231 |
| 5,730,377 | 3/1998 | Shinohara ............................... | 242/231 |
| 5,769,344 | 6/1998 | Kaneko et al. ....................... | 242/230 X |
| 5,839,681 | 11/1998 | Kaneko ................................... | 242/231 |
| 5,845,858 | 12/1998 | Amano et al. .......................... | 242/231 |
| 5,848,757 | 12/1998 | Amano et al. .......................... | 242/231 |
| 5,911,377 | 6/1999 | Jung ....................................... | 242/231 |
| 5,954,284 | 9/1999 | Tsukihiji et al. ...................... | 242/231 |
| 5,984,219 | 11/1999 | Miyajima et al. ..................... | 242/231 |

FOREIGN PATENT DOCUMENTS 8-280305  10/1996  Japan.

*Primary Examiner*—Donald P. Walsh
*Assistant Examiner*—Emmanuel M. Marcelo
*Attorney, Agent, or Firm*—Liniak, Berenato, Longacre & White

[57] ABSTRACT

In a spinning reel for fishing structured such that, on the leading end of a support arm disposed on a rotor rotatable in linking with the operation of a handle, there is supported a support member including a line roller. The support member can be reversed between a fishing line take-up position and a fishing line play-out position. A fishing line is taken up and guided onto a spool through the line roller. The line roller is formed of hard and transparent material.

11 Claims, 8 Drawing Sheets

SPINNING REEL FOR FISHING HAVING TRANSPARENT LINE ROLLER

BACKGROUND OF THE INVENTION

The present invention relates to a spinning reel for fishing.

A spinning reel for fishing is arranged as follows: a semi-circular bail is mounted through support members onto the leading ends of a pair of support arms of a rotor so as to be movable between a fishing line take-up position side and a fishing line play-out position side. A line roller for guiding a fishing line from the top end of a fishing rod toward a spool during taking-up or winding of the fishing line is mounted on one of the support members.

After the bail is raised up to the fishing line take-up position, the rotor is rotated in a fishing line take-up direction by operating a handle, so that the fishing line is wound through the line roller around the spool which can be reciprocated back and forth in linking with the rotation of the rotor. On the other hand, after the bail is reversed to the fishing line play-out position side, terminal tackles are cast, so that the fishing line wound around the spool is played out from the spool in a spiral manner.

Since this type of line roller is formed by grinding ceramics material, brass or the like, the finished surface of the line roller is rough and, therefore, if the fishing line is used together with the line roller for a long period of time, then there is a fear that the fishing line can be damaged and cut by the rough surface of the line roller.

In view of this, recently, in order to not only relieve the surface roughness of the line roller to thereby prevent the fishing line against cutting but also enhance the surface hardness of the line roller to thereby prevent the line roller against wear due to the fishing line, there is proposed a line roller in which a base body formed of metal material is plated with a ground layer made of hard chromium, nickel or the like and, after then, onto the thus treated base body, there is applied a coating layer formed of nitride ceramics such as TiN, AlN or the like or carbide ceramics such as TiC, SiC or the like (see Japanese Patent Publication No. Hei. 8-280305).

According to the above-mentioned line roller, when compared with the conventional line roller that is formed simply by grinding ceramics material, brass or the like, it is possible to reduce the occurrence of the damaged fishing line but, in fact, the occurrence of the damaged fishing line cannot be eliminated completely.

Here, FIG. 12 shows the measured results of the surface roughness of the above-mentioned line roller with a coating layer formed of TiN placed on the surface thereof. In particular, when the measurement was made under the illustrated setting conditions, there were obtained the measured values such as Rz=0.75 $\mu$m, Ry=1.06 $\mu$m, and also there was obtained a roughness curve which is shown in FIG. 12.

By the way, adding some explanation as to FIG. 12, as known well conventionally, the term "roughness curve" means a curve which is obtained by removing surface wave components having longer wavelengths than a given wavelength from a section curve (a cut obtained by cutting the surface of the line roller along a plane at right angles to a surface to be measured; contour) Also, in FIG. 12, reference characters Ra, Rz, and Ry are respectively parameters specified in JISB0601-1994, that is, Ra, Rz, and Ry respectively stand for "arithmetic mean roughness", "ten-points mean roughness", and "maximum height" in the measurements of the surface roughness.

In FIG. 12, Rz. DIN, Ry. DIN, RK, Rpk, Rvk, Mr1, and Mr2 are respectively other parameters than those specified in the JIS30601-1994, that is, they represent "ten-pointsmean roughness (which can be obtained from the whole evaluation length)", "maximum height (which can be obtained from the whole evaluation length)", "effective load roughness", "initial wear height", "oil collecting depth", "load length rate 1", "load length rate 2" in the measurements of the surface roughness, respectively.

Accordingly, in the above-mentioned line roller, even if a coating layer is disposed on the outer surface thereof using TiN, Rz=0.75 $\mu$m is its limit and it is impossible to make the surface of the line roller smoother than the limit value.

Also, since a spinning reel has a structure that, as the rotor is rotated, the fishing line containing seawater, sand, foreign objects and the like is contacted with the line roller and is then guided onto the spool, the seawater, sand and the like invade and stick to the inside of the line roller from the side portions thereof, so that the inside of the line roller is easy to corrode. Therefore, in order to maintain the stable function of the line roller, it is essential to maintain the line roller at an opportune moment (for example, timely cleaning or lubrication is essential).

However, as described above, in the present state of the conventional line roller, the line roller is formed by grinding the ceramics material, brass or the like and the coating layer is deposed on the surface of the line roller to thereby show a metallic-style appearance.

Therefore, it is difficult to confirm the conditions (such as the degree of corrosion of the inside of the line roller, degree of invasion of foreign objects, and the like) of the inside of the line roller, which makes it impossible to maintain the line roller properly.

SUMMARY OF THE INVENTION

The present invention aims at eliminating the drawbacks found in the conventional spinning reels for fishing.

Accordingly, it is an object of the invention to provide a spinning reel for fishing in which the timely maintenance of a line roller is possible to thereby be able to maintain the stable function of the line roller, and, without executing such surface treatment on the surface of the line roller as in the conventional line roller, the surface hardness of the line roller can be enhanced and the surface of the line roller can be made smooth, thereby being able not only to reduce greatly the occurrence of the damaged or cut fishing line but also to give the line roller a sense of high quality. Another object of the invention is to provide a line roller mountable to a spinning reel for fishing, which can provide the above-noted features to the spinning reel.

In attaining the above object, a line roller according to a preferred embodiment is formed of hard and transparent material. In an actual fishing operation, a fishing line containing seawater, sand and the like is contacted with the surface and main guide portion of a line roller and is then guided onto a spool while being scrubbed by the surface and main guide portion of the line roller. Consequently, the seawater, strange objects and the like invade and stick to the inside of the line roller through the side portions of the line roller. The invading and sticking conditions of the seawater and the like can be confirmed visually through the line roller or the main guide portion of the line roller.

It is preferable that the surface roughness of the line roller is set such that a ten-points means roughness (Rz) in a surface roughness measurement is equal to or less than 0.5 $\mu$m. Since the surface of the fishing line guide portion of the line roller is formed very smooth, when compared with the conventional line roller, the take-up resistance of the fishing line can be reduced, with the result that the fishing line can be guided smoothly onto the spool by the line roller.

It is preferable that the fishing line guide portion of the line roller is so set as to have a thickness in the range of 0.4–5 mm. The fishing line guide portion of the line roller diffuses the light to thereby be able to show an appearance which is very fine and has a sense of high quality as if it were the sparkle of a jewel.

DESCRIPTION OF THE PREFERRED EMBODIMENT

Now, description will be given below in detail of the preferred embodiments of a spinning reel for fishing according to the invention with reference to the accompanying drawings.

Figure 1:
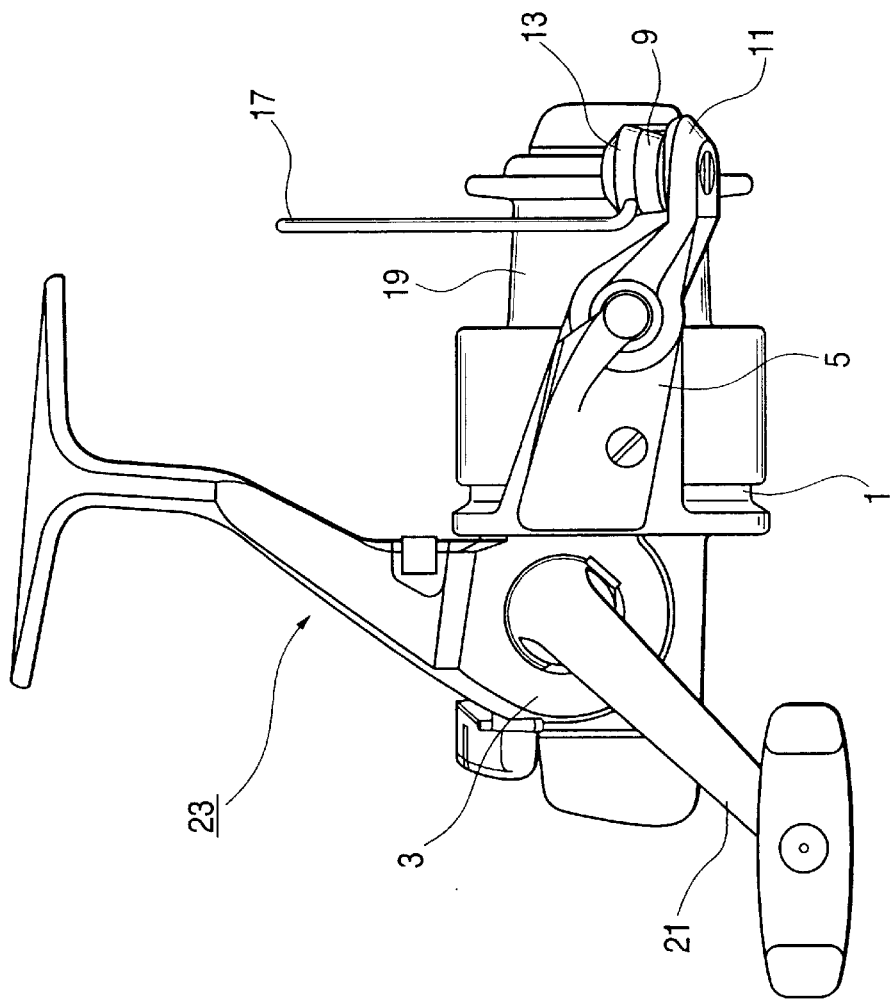
FIG. 1 is a front view of a spinning reel according to an embodiment of the invention.
Figure 2:
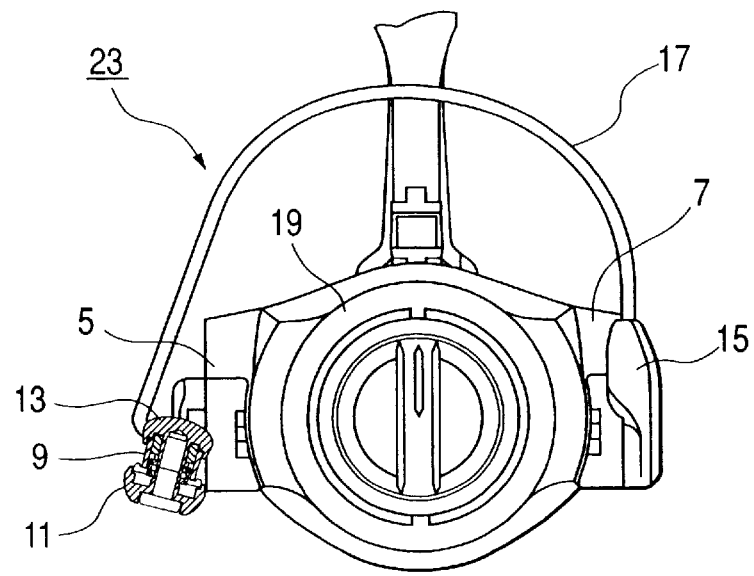
FIG. 2 is a side view of the spinning reel shown in FIG. 1.
Figure 3:
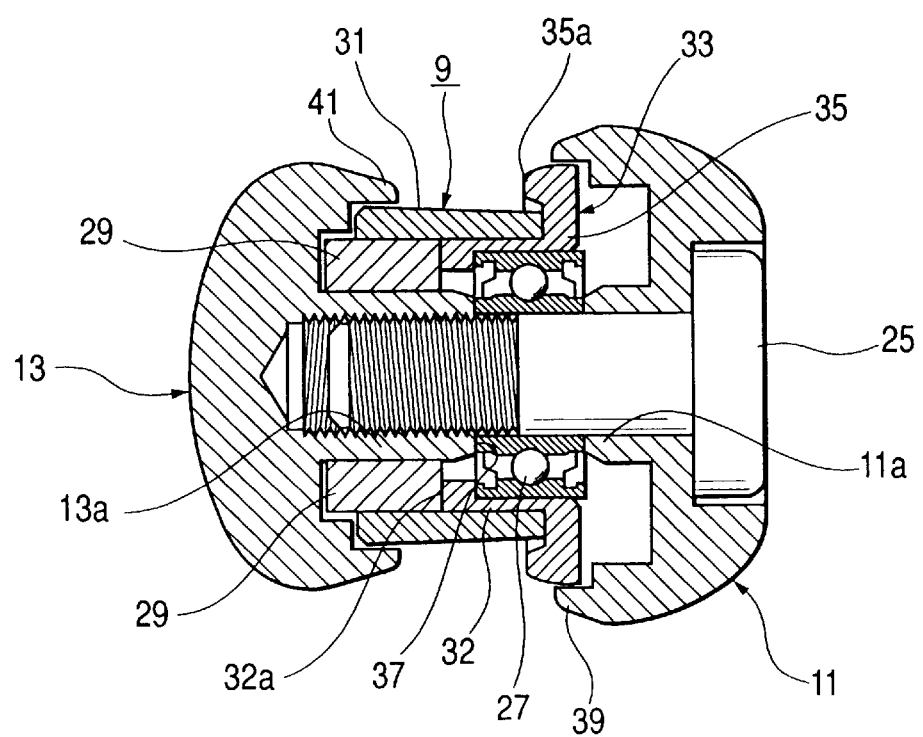
FIG. 3 is a section view of a line roller and its mounting structure respectively employed in the spinning reel shown in FIG. 1.

FIGS. 1 to 3 respectively show a first embodiment of a spinning reel for fishing according to the invention. In FIG. 1, reference character 1 designates a rotor which is rotatably mounted on a reel main body 3 and, as shown in FIG. 2, a pair of support arms 5 and 7 are formed integrally with the rotor 1.

And, on the leading end of one support arm 5, there is mounted a bail support member, which is made up of a bail arm 11 for supporting a line roller 9 and a line slider 13, in such a manner that the bail support member can be freely reversed between a fishing line take-up position side and a fishing line play-out position side; and, on the other support arm 7, there is mounted a bail holder 15 in such a manner that, similarly to the bail support member, it can be freely reversed between a fishing line take-up position side and a fishing line play-out position side, while a semi-annular bail 17 is mounted between the bail holder 15 and line slider 13.

Also, in FIGS. 1 and 2, 19 stands for a spool which is mounted on the same shaft as the rotor 1. The spool 19 is supported by a spool shaft (not shown) which is mounted on the reel main body 3 in such a manner that it is able to traverse. If a bail 17 is fallen down onto the fishing line take-up position side and, by operating a handle 21, the rotor 1 is rotated in the fishing line take-up direction, then a fishing line can be wound around the spool 19 which traverses back and forth in linking with the rotation of the rotor 1.

And, in a spinning reel 23 according to the present embodiment, not only is there employed the above-mentioned structure which is similar to the conventional spinning reel, but also the line roller 9 is improved, thereby attaining the above-mentioned object of the invention.

Now, FIG. 3 shows the line roller 9 and a structure for mounting the line roller 9. In FIG. 3, 25 designates a bolt which is used to connect together the bail arm 11 and line slider 13; between shaft portions 11a and 13a of the bail arm 11 and line slider 13, there is interposed a bearing 27 which supports the line roller 9 in such a manner that the line roller 9 can be rotated; and, onto the shaft portion 13a, there is fitted an annular-shaped resin bush 29 which supports the line roller 9 at a given position.

The line roller 9 is composed of a cylindrical-shaped fishing line guide portion 31 for guiding a fishing line to the spool 19 during the fishing operation, and a wall-shaped portion 33 formed of metal (such as brass) and including a shaft portion 32 fixed to the inner periphery of the fishing line guide portion 31; and, the fishing line guide portion 31 is formed of blue tempered glass which is hard and transparent material through which the inside of the line roller 9 can be visually seen from the outside, and has a thickness in the range of 0.4 mm–1.0 mm, while the outer periphery of the fishing line guide portion 31 is formed in a tapered shape which decreases gradually in diameter from the line slider 13 side to the bail arm 11 side.

Figure 4:
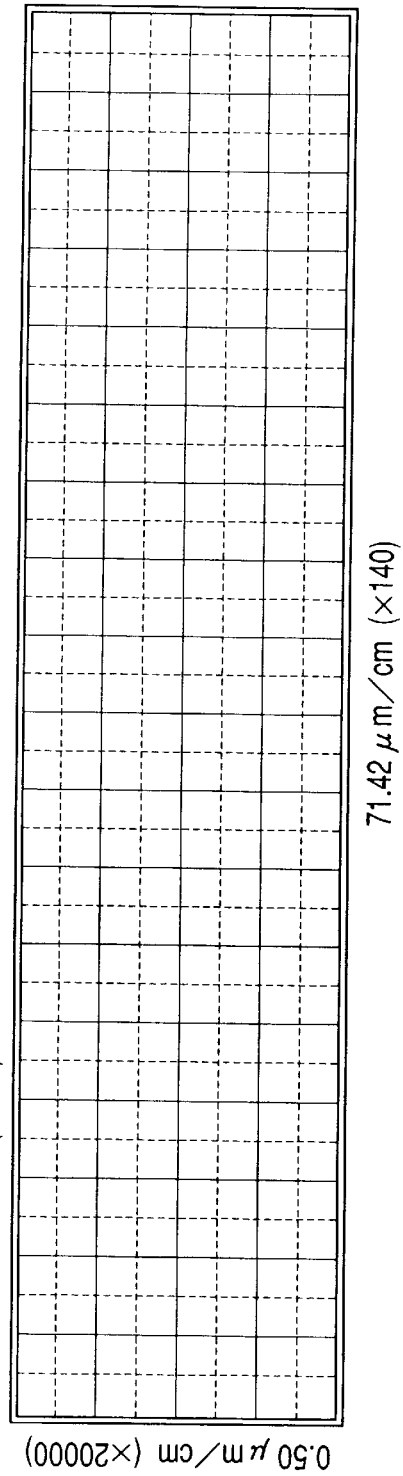
FIG. 4 is an explanatory view of setting conditions for measuring the surface roughness of the line roller mounted in the spinning reel shown in FIG. 1 and the measured results thereof.
Figure 12:
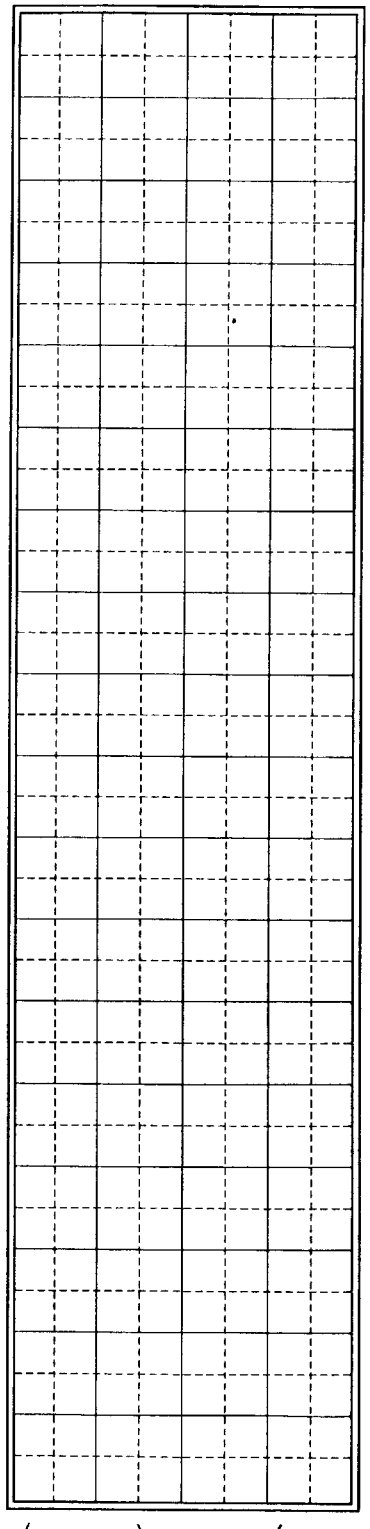

And, the tempered glass forming the fishing line guide portion 31 is polished so that the surface of the tempered glass is very smooth; and, FIG. 4 shows the measured results of the surface roughness of the present tempered glass under the same conditions as in FIG. 12.

As shown in FIG. 4, when the roughness curve of the tempered glass forming the fishing line guide portion 31 is compared with the roughness curve of FIG. 12, it can be understood how smooth the surface of the tempered glass in the present embodiment is; and, it can be understood also from the numerical values of the respective parameters including the "ten-points mean roughness" how smooth the surface of the fishing line guide portion 31 formed of the tempered glass is.

On the other hand, the wall-shaped portion 33 projects from one side portion of the fishing line guide portion 31 toward the bail arm 11 side and, in the present projecting portion of the wall-shaped portion 33, a wall portion 35 with an annular-shaped guide projecting piece 35a projecting in the line slider 13 direction is formed integrally with the shaft portion 32; and, in a fishing line take-up operation, the guide projecting piece 35a is contacted with the fishing line to restrict the movement of the fishing line in the axial direction of the line roller 9, thereby being able to hold the fishing line at a given position of the fishing line guide portion 31 all the time.

And, on the inner periphery of the shaft portion 32 of the wall-shaped portion 33, there is disposed a bearing support portion 37 to be secured to the bearing 27, while the leading end portion 32a of the shaft portion 32 is in contact with a bush 29 inserted into the fishing line guide portion 31, whereby the bush 29 and bearing support portion 37 restrict the movement of the line roller 9.

Further, in FIGS. 3, 39 and 41 respectively designate annular-shaped flange portions which are respectively formed on the peripheral edge portions of the bail arm 11 and line slider 13; and, in particular, the flange portions 39 and 41 prevent the fishing line from entering from gaps between the line roller 9 and bail arm 11, line slider 13, that is, the flange portions 39 and 41 can prevent the fishing line from being entwined itself.

As the spinning reel 23 according to the present embodiment is structured in the above-mentioned manner, if the bail 17 is raised up to the fishing line take-up position side and, by operating the handle 21, the rotor 1 is rotated in the fishing line take-up position direction, then the fishing line is wound around the spool 19 which traverses back and forth in linking with the rotational movement of the rotor 1. In this fishing line take-up operation, as described above, since the surface of the fishing line guide portion 31 of the line roller 9 is formed very smooth, the take-up resistance of the fishing line is reduced when compared with the conventional spinning reel, with the result that the fishing line can be smoothly guided onto the spool 19 by the line roller 9.

And, because the fishing line guide portion 31 is formed in a tapered shape which decreases gradually in diameter from the line slider 13 side to the bail arm 11 side, the friction between the fishing line guide portion 31 and fishing line is stronger on the large diameter side, with the result that the fishing line is contacted with the guide projecting piece 35a due to the action of the friction resistance of the fishing line guide portion 31 to whereby be able to restrict the movement of the fishing line in the axial direction of the line roller 9.

Thus, even if the fishing line winding diameter of the spool 19 is caused to vary as the fishing line is taken up around the spool 19, the fishing line is always contacted with the guide projecting piece 35a due to the action of the friction resistance of the fishing line guide portion 31, so that the fishing line can be always held at a given position of the line roller 9.

Also, as described above, since the friction between the fishing line guide portion 31 and fishing line is stronger on the large diameter side, as the fishing line is taken up, the fishing line is wound around the spool 19 in such a manner that it is twisted due to the taper action of the fishing line guide portion 31 in the opposite direction to the twisting of the fishing line occurring in the casting operation; that is, the thus produced twisting of the fishing line can cancel the twisting of the fishing line that is caused in the fishing line play-out operation.

Further, because the fishing line guide portion 31 has a thickness in the range of 0.4 mm–1.0 mm, it diffuses the light to thereby be able to show an appearance which is very fine and high in quality.

Still further, in an actual fishing operation, since a fishing line containing seawater, sand and the like is contacted with the fishing line guide portion 31, that is, since the fishing line is guided onto the spool 19 while it is scrubbed by the fishing line guide portion 31, the seawater, foreign objects and the like invade and stick to the inside of the line roller 9 from the side portions of the line roller 9. In particular, if seawater invades the inside of a line roller, in the conventional line roller, it is impossible to confirm the conditions of the inside of the line roller until the grease of the bearing percolates through between the line roller and bush, with the result that the corrosion and contamination of the inside of the line roller are allowed to run worsened.

However, according to the present embodiment, in an early stage where the melted grease of the bearing 27 percolates through between the bush 29 and the leading end portion 32a of the shaft portion 32 of the wall-shaped portion 33, the conditions of the inside of the line roller 9 can be confirmed visually through the fishing line guide portion 31 of the line roller 9.

In this manner, according to the present embodiment, since the fishing line guide portion 31 of the line roller 9 is formed of the tempered glass having a very smooth surface, the fishing line is difficult to be damaged. As a result of this, when compared with the conventional line roller, not only the durability of the fishing line can be enhanced but also the occurrence of the damaged or cut fishing line can be reduced to a great extent.

Also, due to the fact that the sliding property of the fishing line guide portion 31 is improved in this manner, not only the resistance of the fishing line in the fishing line take-up operation is reduced to thereby be able to enhance the fishing line take-up efficiency, but also, with no execution of such surface treatment as has been employed in the conventional spinning reel, the surface hardness of the line roller 9 can be enhanced and the fishing line guide portion 31 of the line roller 9 can be made flat and smooth.

Further, according to the present embodiment, because the fishing line guide portion 31 of the line roller 9 diffuses the light to thereby be able to show an appearance which is very fine and high in quality, a sense of higher quality than the conventional spinning reel can be given to the present spinning reel 23 and also, since the fishing line guide portion 31 secures the above-mentioned thickness, the present line roller 9 is able to maintain a similar strength to the conventional line roller.

In addition, according to the present embodiment, the corrosion condition of the inside of the line roller 9 as well as the invasion and sticking conditions of the foreign objects in the inside of the line roller 9 can be confirmed in an early stage. As a result of this, timely maintenance is possible to thereby be able to maintain the stable fishing line take-up function of the line roller 9. Also, because the fishing line guide portion 31 is formed of the hard material that can be seen through and is produced separately from the wall-shaped portion 33, the fishing line guide portion 31 can be simplified in shape, which makes is possible to facilitate the manufacture of the fishing line guide portion 31 using the hard material. And, the selection range of the shape and material combinations of the fishing line guide portion 31 with respect to the wall-shaped portion 33 can be widened, and thus the freedom of the design of the fishing line guide portion 31 can be increased.

By the way, in the above-mentioned embodiment, the line roller 9 is mounted between the bail arm 11 and line slider 13 through the bearing 27, which makes it possible to improve the sliding property of the fishing line on the fishing line guide portion 31. As a side effect, this eliminates the need of the rotatable support of the line roller 9 by the bearing 27; that is, the bearing 27 can be omitted.

Therefore, for example, if a line roller, the fishing line guide portion of which is so molded as to have a thickness of 5 mm, is fixedly mounted between a bail arm and a line slider, then the weight of the spinning reel can be reduced by an amount equivalent to the weight of the thus omitted bearing, which can improve the rotation balance of the rotor.

Figure 5:
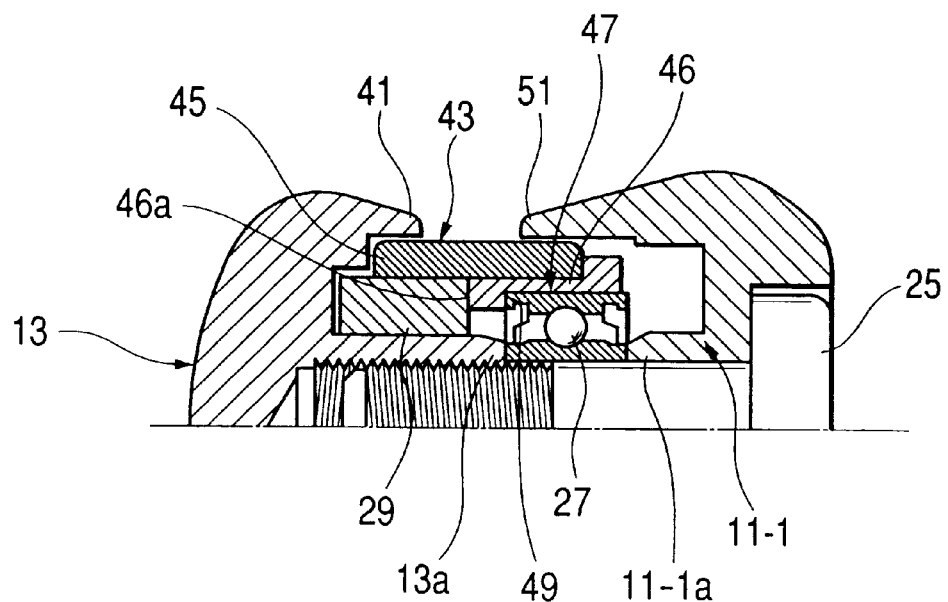
FIG. 5 is a section view of a line roller and its mounting structure respectively employed in a spinning reel according to a second embodiment of the invention.

Now, FIG. 5 shows a line roller and its mounting structure respectively employed in a spinning reel according to a second embodiment of the invention. Description will be given below of the second embodiment with reference to the accompanying drawings, while the same parts thereof as those employed in the previously described first embodiment are given the same reference characters and thus the description thereof is omitted here.

In FIG. 5, reference character 43 designates a line roller rotatably supported by a bearing 27 which is mounted between the shaft portion 11-1a of a bail arm 11-1 and the shaft portion 13a of a line slider 13. The line roller 43 comprises a cylindrical-shaped fishing line guide portion 45 for taking up and guiding a fishing line onto a spool 19 in an actual fishing operation, and a cylindrical-shaped guide support member 47 with the shaft portion 46 thereof fixedly secured to the inner periphery of the fishing line guide portion 45. The fishing line guide portion 45 is formed of tempered glass having a similar surface roughness to the previously described fishing line guide portion 31, whereas the guide support member 47 is formed of the same material as the previously described wall-shaped portion 33.

And, on the inner periphery of the shaft portion 46 of the guide support member 47, there is formed a bearing support portion 49 to be secured to the bearing 27, while the leading end portion 46a of the shaft portion 46 is in contact with a bush 29 inserted into the fishing line guide portion 45; and, the bush 29 and bearing support portion 49 cooperate together to restrict the movement of the line roller 43 in the axial direction thereof.

Besides, in FIG. 5, reference character 51 designates an annular-shaped flange portion formed on the peripheral edge portion of the bail arm 11-1. The flange portion 51 cooperates with a flange portion 41 formed on the line slider 13 side to prevent the fishing line from being entwined itself.

Figure 6:
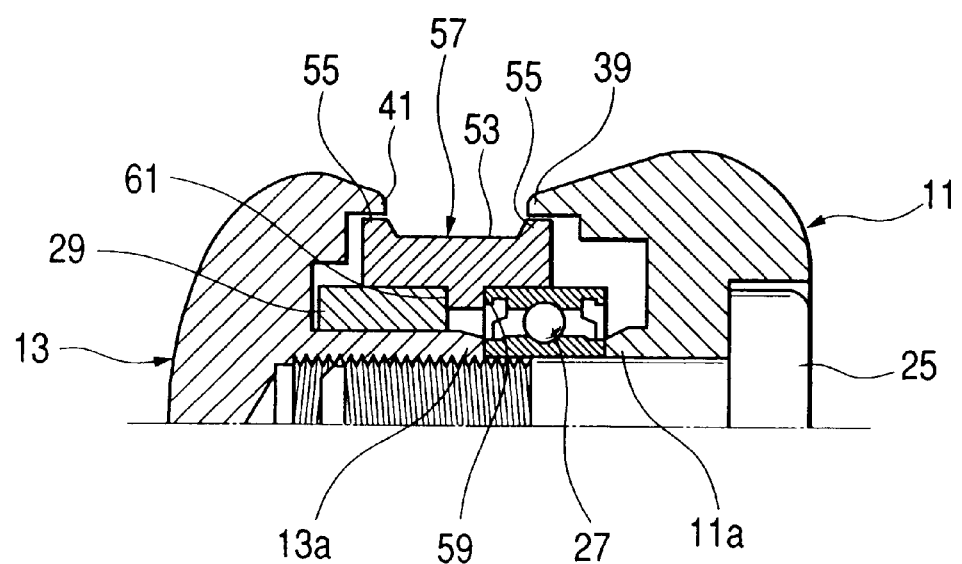
FIG. 6 is a section view of a line roller and its mounting structure respectively employed in a spinning reel according to a third embodiment of the invention.

Now, FIG. 6 shows a line roller and its mounting structure respectively employed in a spinning reel according to a third embodiment of the invention. According to the third embodiment, the whole line roller 57, in which two wall-shaped portions 55 are respectively formed integrally with the two end portions of a cylindrical-shaped fishing line guide portion 53, is molded of the same material as the previously described fishing line guide portion 31 in such a manner that it has the same surface roughness as that of the fishing line guide portion 31 and has a thickness of the order of 3 mm; and, on the inner periphery of the line roller 57, there are formed the bearing support portion 59 of a bearing 27 for supporting the line roller 57 in a rotatable manner and a bush support portion 61 to be secured to a bush 29. The two support portions 59 and 61 cooperate together to restrict the movement of the line roller 57 in the axial direction thereof.

By the way, the remaining portions of the structure of the third embodiment are similar to those of the embodiment shown in FIG. 1. Therefore, the same parts of the third embodiment are given the same reference characters as those of the first embodiment and thus the description thereof is omitted here.

Thus, according to the second and third embodiments as well, since the surfaces of the fishing line guide portions 45 and 53 are very smooth, the fishing line is difficult to be damaged in the fishing line take-up operation, with the result that, when compared with the conventional spinning reel, the durability of the fishing line can be enhanced as well as the occurrence of the cut fishing line can be reduced to a great extent.

Also, due to the fact that the fishing line guide portions 45 and 53 are improved in the sliding property thereof, not only the resistance of the fishing line in the fishing line take-up operation can be reduced to thereby enhance the fishing line take-up efficiency, but also, without executing such surface treatment on the surfaces of the line rollers 43 and 57 as in the conventional line roller, the surface hardness of the line rollers 43 and 57 can be enhanced and also the line rollers 43 and 57 can be made flat and smooth.

Further, according to the second and third embodiments as well, the line rollers 43 and 57 respectively diffuse the light to thereby be able to show an appearance having such sense of high quality as the sparkle of a jewel as well as they respectively secure a sufficient thickness, which makes it possible for the present line rollers 43 and 57 to maintain a similar strength to the conventional line roller.

In addition, in the second and third embodiments as well, timely maintenance is possible, thereby being able to maintain the stable fishing line take-up functions of the line rollers 43 and 57.

Now, FIGS. 7 to 10 respectively show line rollers and their mounting structures respectively employed in fourth to seventh embodiments of the invention, while description will be given below of these embodiments with reference to their associated figures. By the way, since the structures of these embodiments except for their inventive portions are similar to the structure of the embodiment shown in FIG. 1, the same parts thereof are given the same reference characters and thus the description thereof is omitted here.

Figure 7:
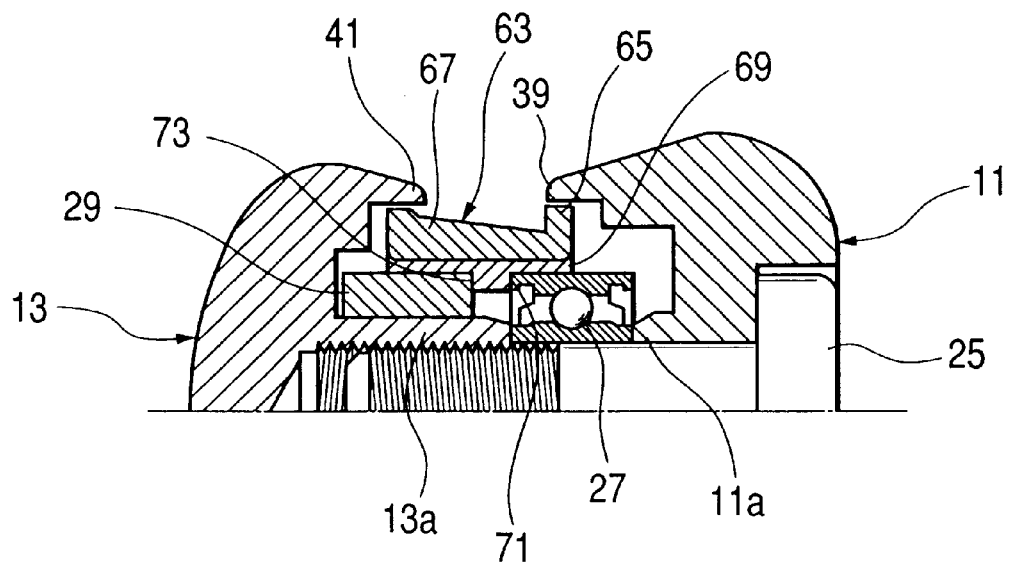
FIG. 7 is a section view of a line roller and its mounting structure respectively employed in a spinning reel according to a fourth embodiment of the invention.

Referring now to FIG. 7 in which a fourth embodiment of the invention is shown, reference character 63 designates a line roller which is rotatably supported through a bearing 27 between a bail arm 11 and a line slider 13. The line roller 63 is composed of a fishing line guide portion 67 with a disk-like wall-shaped portion 65 thereof formed integrally with the side end portion of the bail arm 11, and a cylindrical-shaped metal-made guide support member 69 fixedly secured to the interior portions of the fishing line guide portion 67 and wall-shaped portion 65, while the fishing line guide portion 67 is so formed as to be tapered from the line slider 13 side to the bail arm 11 side.

And, the fishing line guide portion 67 and wall-shaped portion 65 are formed of the same material as the previously described fishing line guide portion 31 with the same surface roughness as that of the fishing line guide portion 31, while the fishing line guide portion 67 is so set as to have a thickness in the range of 0.4–1.0 mm. And, on the inner periphery of the guide support member 69, there are formed the bearing support portion 71 of a bearing 27 and a bush support portion 73 to be secured to a bush 29.

Figure 8:
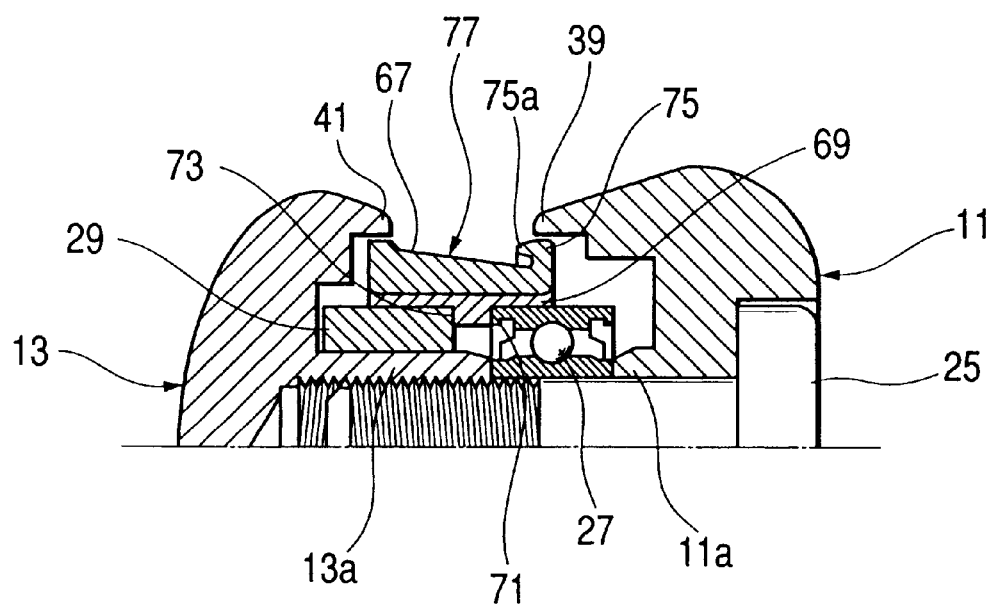
FIG. 8 is a section view of a line roller and its mounting structure respectively employed in a spinning reel according to a fifth embodiment of the invention.

On the other hand, in a fifth embodiment shown in FIG. 8, a line roller 77 is structured in the following manner: that is, instead of the above-mentioned wall-shaped portion 65 which is formed in a disk shape, on the bail arm 11 side end portion of the fishing line guide portion 67, there is integrally formed a wall-shaped portion 75 having an annular-shaped guide projecting piece 75a which projects in the direction of a line slider 13.

Figure 9:
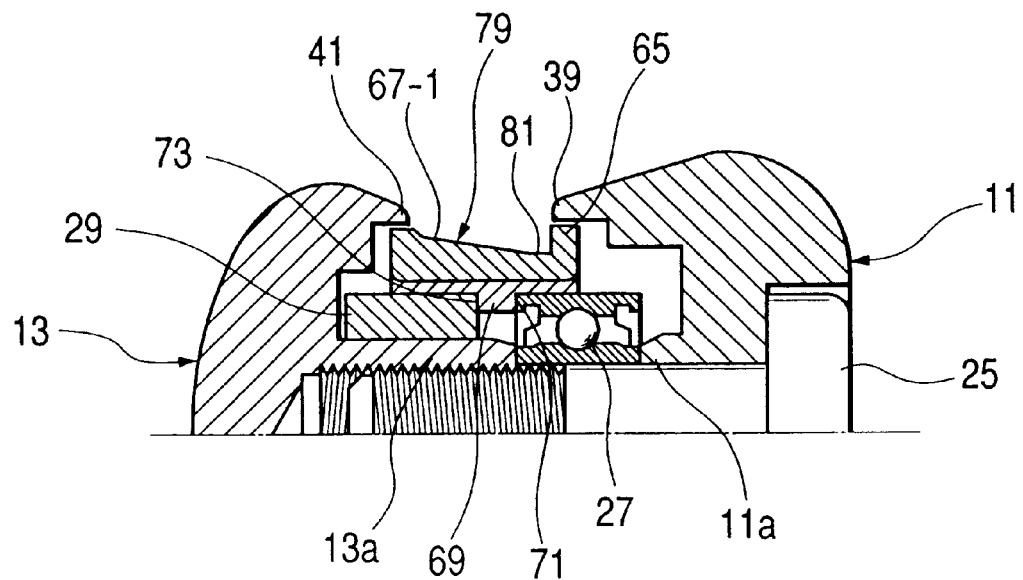
FIG. 9 is a section view of a line roller and its mounting structure respectively employed in a spinning reel according to a sixth embodiment of the invention.
Figure 10:
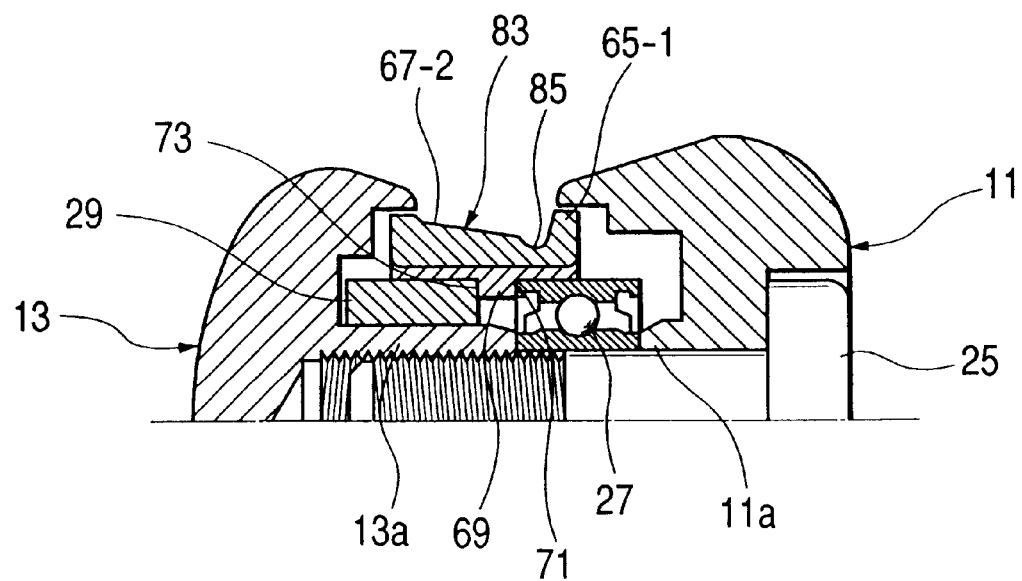
FIG. 10 is a section view of a line roller and its mounting structure respectively employed in a spinning reel according to a seventh embodiment of the invention.

And, a line roller 79 shown in FIG. 9 comprises a cylindrical-shaped portion 81 formed between a wall-shaped portion 65 and a fishing line guide portion 67-1 which is tapered from the line slider 13 side to the bail arm 11 side. Also, in a line roller 83 shown in FIG. 10, there is formed a recessed portion 85 in the form of an annular groove between a similarly tapered fishing line guide portion 67-2 and a wall-shaped portion 65-1. In both of the line rollers 79 and 83, the fishing line guide portions 67-1, 67-2 and wall-shaped portions 65, 65-1 are formed of the same material as the previously described fishing line guide portion 31 with the same surface roughness as that of the fishing line guide portion 31.

Thus, according to the above-mentioned fourth to seventh embodiments as well, similarly to the embodiment shown in FIG. 1, the expected object of the invention can be achieved.

Figure 11:
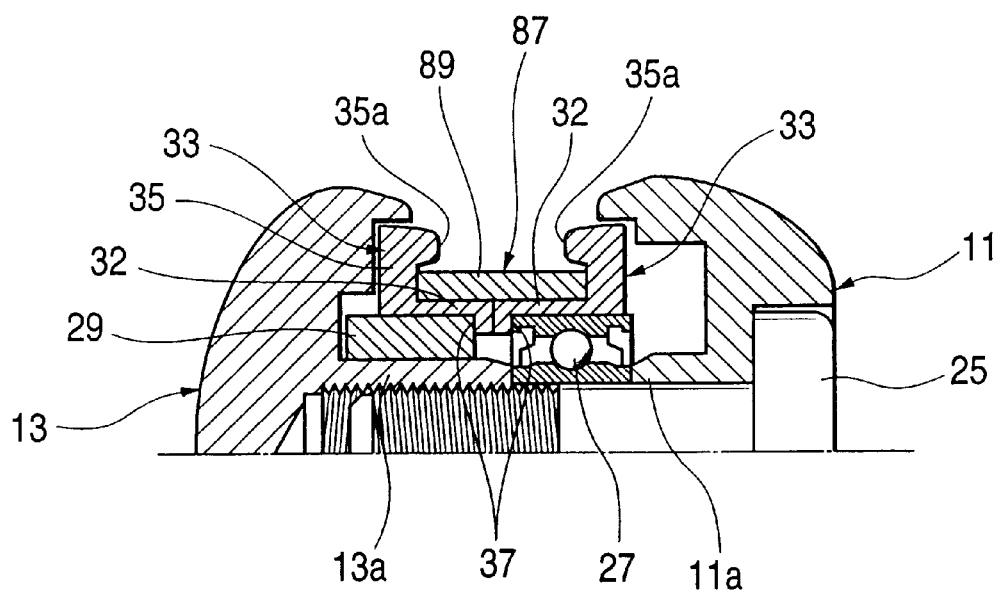
FIG. 11 is a section view of a line roller and its mounting structure respectively employed in a spinning reel according to an eighth embodiment of the invention; and, FIG. 12 is an explanatory view of setting conditions for measuring the surface roughness of a conventional line roller with a TiN coating layer formed on the surface thereof and the measured results thereof.

Now, FIG. 11 shows a line roller and its mounting structure respectively employed in a spinning reel according to an eighth embodiment of the invention. Referring to the structure of a line roller 87 employed in the eighth embodiment, two wall-shaped portions 33, each of which is the same as the wall-shaped portion 33 shown in FIG. 3, are respectively mounted symmetrically on the two side portions of a cylindrical-shaped fishing line guide portion 89 which is formed of the same material as the fishing line guide portion 45 shown in FIG. 5 with the same surface roughness as that of the fishing line guide portion 45. In this embodiment, a bush 29 is secured to a bearing support portion 37 formed in the shaft portion 32 of the wall-shaped portion 33 located on the line slider 13 side. That is, the bearing 27 and bush 29 cooperate together to restrict the movement of the line roller 87. In this embodiment, the line roller 87 is made up of a first line roller section having the line guide portion 89, a second line roller section having the right wall-shaped portion 33, and a third line roller section having the left wall-shaped portion 33.

By the way, since the remaining portions of the structure of the eighth embodiment ar e similar to the structure of the embodiment shown in FIG. 1, the description thereof is omitted here.

Thus, according to the present embodiment as well, since the fishing line guide portion 89 of the line roller 87 is molded of tempered glass the surface of which is very smooth, the fishing line is difficult to be damaged in the fishing line take-up operation, with the result that, when compared with the conventional line roller, the durability of the fishing line can be enhanced as well as the occurrence of the damaged or cut fishing line can be reduced to a great extent.

Also, due to the fact that the fishing line guide portion 89 is improved in the sliding property thereof, not only the resistance of the fishing line in the fishing line take-up operation can be reduced to thereby enhance the fishing line take-up efficiency, but also, without executing such surface treatment on the surface of the line roller 87 as in the conventional line roller, the surface hardness of the line roller 87 can be enhanced and also the fishing line guide portion 89 can be made flat and smooth.

Further, according to the present embodiment, since the fishing line guide portion 89 diffuses the light to thereby be able to show an appearance having such sense of high quality as the sparkle of a jewel; and also, because the fishing line guide portion 89 secures the above-mentioned thickness, the present line roller 87 is allowed to maintain a similar strength to the conventional line roller.

In addition, in the present embodiment as well, timely maintenance is possible, thereby being able to maintain the stable fishing line take-up functions of the line roller 87.

Also, in the present embodiment as well, since the fishing line guide portion 89 is molded of the tempered glass that can be seen through and is produced separately from the wall-shaped portion 33, the shape of the fishing line guide portion 89 can be simplified, which makes it possible to facilitate the manufacture of the fishing line guide portion 89. And, the selection range of the shape and material combinations of the fishing line guide portion 89 with respect to the wall-shaped portion 33 can be widened, and thus the freedom of the design of the fishing line guide portion 89 can be increased.

By the way, in the respective embodiments that have been described hereinbefore, for the surface roughness of the tempered glass forming the fishing line guide portion of the line roller, there is employed the ten-points mean roughness (Rz)=0.07 $\mu$m. However, this is not limitative but, even if the ten-points mean roughness (Rz) is set as 0.05 $\mu$m or less, the expected object of the invention can also be achieved.

Also, preferably, the fishing line guide portion of the line roller may have a thickness in the range of 0.4–5 mm. If the thickness is smaller than this range, then the strength of the fishing line guide portion cannot be secured, nor is obtained the above-mentioned light diffusion, which is makes it difficult to secure a sufficient aesthetic effect in appearance.

And, in the above-mentioned respective embodiments, there is used tempered glass as the material of the fishing line guide portion of the line roller. This is not limitative but, instead of the tempered glass, there can also be used other hard material that can be seen through, for example, transparent alumina, artificial jewels (artificial ruby, artificial sapphire, artificial diamond) and the like.

As has been described heretofore, according to the invention, since the conditions of the inside of the line roller can be confirmed visually, timely maintenance is possible, which makes it possible to maintain the stable fishing line take-up function of the line roller.

And, according to the invention, because the fishing line guide portion of the line roller is very smooth and thus the sliding property thereof is improved, in the fishing line take-up operation, the fishing line is difficult to be damaged, with the result that, when compared with the conventional spinning reel, the durability of the fishing line is enhanced and the occurrence of the damaged or cut fishing line can be reduced greatly.

Also, due to the fact that the fishing line guide portion of the line roller is improved in the sliding property thereof in this manner, not only the resistance of the fishing line in the fishing line take-up operation can be reduced to thereby enhance the fishing line take-up efficiency, but also, without executing such surface treatment on the surface of the line roller as in the conventional line roller, the surface hardness of the line roller can be enhanced and also the fishing line guide portion can be made flat and smooth.

Further, according to the invention, since the fishing line guide portion of the line roller diffuses the light to thereby be able to show an appearance having such sense of high quality as the sparkle of a jewel, a sense of high quality can be given to the appearance of the spinning reel when compared with the conventional spinning reel. Also, because the fishing line guide portion secures a sufficient thickness, the present line roller is allowed to maintain a similar strength to the conventional line roller.

What is claimed is:

1. A spinning reel for fishing, comprising:
a reel main body;
a spool supported to said reel main body;

a rotor rotatably supported with respect to said reel main body for winding a fishline onto said spool, said rotor having an arm;

a line roller mounted to said arm, said line roller contacting and guiding said fishline to said spool during the winding, said line roller having a first axial end proximal to said arm, a second axial end opposite from said first axial end, and a line guide portion extending between said first and second axial ends, wherein said line roller is at least partially formed of a transparent hard material.

2. The spinning reel according to claim 1, wherein said line guide portion of said line roller is formed of said transparent hard material.

3. The spinning reel according to claim 1, wherein said transparent hard material includes at least one of a tempered glass, an alumina and an artificial jewel.

4. The spinning reel according to claim 1, wherein a mean surface roughness of said hard material as measured at ten points on a surface of the line guide portion is 0.5 µm or less.

5. The spinning reel according to claim 1, wherein a radial thickness of said line guide portion is in a range of 0.4–5 mm.

6. The spinning reel according to claim 1, wherein said line guide portion increases in diameter from said first axial end to said second axial end.

7. The spinning reel according to claim 1, wherein said line guide portion has a wall portion, said wall portion radially projectiong from said first axial end, said wall portion being contactable with said fishline.

8. The spinning reel according to claim 1, wherein said line roller is rotatable about an axis.

9. The spinning reel according to claim 1, wherein said line guide portion of said line roller is separately formed of said transparent hard material disposed on an exterior surface of said line roller.

10. A spinning reel for fishing, comprising:

a reel main body;

a spool supported on said reel main body;

a rotor rotatably supported with respect to said reel main body for winding a fishline onto said spool, said rotor having an arm; and a line roller mounted to said arm, said line roller contacting and guiding said fishline to said spool during winding, said line roller having a first axial end proximal said arm, a second axial end opposite from said first axial end, a line guide portion extending between said first and second ends, and at least one contact guide portion provided adjacent said line guide portion for contacting said fishline directed onto said line guide portion, wherein said line guide portion is formed of a transparent hard material separate from the contact guide portion.

11. The spinning reel according to claim 10, wherein said contact guide portion is at least partially disposed radially outside said line guide portion to thereby engage said fishline leading to said line guide portion.

* * * * *